United States Patent
Karschnia

(10) Patent No.: US 9,191,063 B2
(45) Date of Patent: Nov. 17, 2015

(54) CHANNEL GREY LISTING

(71) Applicant: Rosemount Inc., Chanhassen, MN (US)

(72) Inventor: Robert John Karschnia, Chaska, MN (US)

(73) Assignee: Rosemount Inc., Chanhassen, MN (US)

( * ) Notice: Subject to any disclaimer, the term of this patent is extended or adjusted under 35 U.S.C. 154(b) by 332 days.

(21) Appl. No.: 13/796,222

(22) Filed: Mar. 12, 2013

(65) Prior Publication Data

US 2014/0269334 A1    Sep. 18, 2014

(51) Int. Cl.
*H04B 1/713* (2011.01)

(52) U.S. Cl.
CPC *H04B 1/713* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 6,549,784 B1 * | 4/2003 | Kostic et al. | 455/501 |
| 7,965,786 B2 | 6/2011 | Hu et al. | |
| 2006/0217071 A1 | 9/2006 | Russo et al. | |
| 2008/0267259 A1 * | 10/2008 | Budampati et al. | 375/134 |
| 2009/0073925 A1 | 3/2009 | Rentel et al. | |
| 2011/0103428 A1 | 5/2011 | Chan | |
| 2014/0086081 A1 * | 3/2014 | Mack et al. | 370/252 |

FOREIGN PATENT DOCUMENTS

WO    2012057533 A2    5/2012

OTHER PUBLICATIONS

Internation Search Report and Written Opinion for PCT/US2014/017981, dated Jul. 3, 2014.

* cited by examiner

*Primary Examiner* — Huy D Vu
*Assistant Examiner* — Bao G Nguyen
(74) *Attorney, Agent, or Firm* — Kinney & Lange, P.A.

(57) ABSTRACT

A wireless communication system grey-lists those channels that interfere with channels used by a second wireless communication system. The wireless communication system reduces the rate at which the grey-listed channels are utilized in the channel-hopping pattern, but does not completely eliminate use of the grey-listed channels.

16 Claims, 4 Drawing Sheets

CHANNEL GREY LISTING

BACKGROUND

The present invention is related to wireless communication systems, and in particular to channel selection in wireless communication systems.

In many industrial settings, control systems are used to monitor and control inventories, processes, and the like. Often, such control systems have a centralized control room with a host computer that communicates with field devices that are separated or geographically removed from the control room.

Generally, each field device includes a transducer, which may generate an output signal based on a physical input or generate a physical output based on an input signal. Types of transducers used in field devices include various analytical equipment, pressure sensors, thermistors, thermocouples, strain gauges, flow sensors, positioners, actuators, solenoids, indicators, and the like. Traditionally, analog field devices have been connected to the process subsystem and the control room by two-wire twisted-pair current loops, with each device connected to the control room by a single two-wire twisted pair loop. Typically, a voltage differential is maintained between the two wires of approximately 20 to 25 volts, and a current between 4 and 20 milliamps (mA) runs through the loop. An analog field device transmits a signal to the control room by modulating the current running through the current loop to a current proportional to the sensed process variable. An analog field device that performs an action under the control of the control room is controlled by the magnitude of the current through the loop, which is modulated by the ports of the process subsystem under the control of the controller.

Wireless communications between field devices and controls rooms have begun to replace the traditional two-wire twisted-pair current loops. For example, each field device and/or node associated with a field device is equipped with a wireless transceiver that allows the field device to communicate messages wirelessly via a wireless communication protocol such as WirelessHART (IEC 62591). The plurality of field devices and/or nodes equipped with wireless transceivers create a wireless mesh network that allows a communication between the control room and any field device within range of the wireless mesh network, with messages hopping from node to node across the mesh network to the desired location.

Like other wireless communication protocols, wireless communication protocols such as WirelessHART employed in control system operate in a defined frequency range that is further sub-divided into a plurality of channels. Communication between two devices using WirelessHART (or some other wireless communication protocol) requires agreement as to the channel on which the communication will occur. However, problems can occur when additional wireless communication protocols (such as WiFi) are operational in the same geographic location as the control system wireless communication protocol. For example, a facility using a control system wireless communication protocol such as WirelessHART may also be employing a WiFi type wireless communication protocol to allow employees to exchange data over a wireless local area network (WLAN). Overlap between the frequencies employed by WirelessHART and by WiFi will result in interference, which may result in messages being lost (i.e., sometimes referred to as packet loss).

To avoid interference between competing wireless communication protocols, it is common to identify the channel(s) being utilized by the competing wireless communication protocol such as WiFi, and then program the control system wireless communication protocol (e.g., WirelessHART) to avoid those overlapping channels. However, blacklisting channels available to the control system wireless communication protocol decreases the number of channels that can be used in a channel hopping sequence and therefore decreases the resiliency of the wireless communication system. The term "resiliency" is used to describe the ability of the wireless network to operate despite intentional or unintentional interference on a channel. For example, typical wireless systems employ channel-hopping among a plurality of channels to prevent a malicious user from jamming a particular frequency to disrupt communications. As the number of channels used by a particular wireless system decreases, the resiliency of the system similarly decreases.

SUMMARY

A method and system of generating a channel-hopping pattern for a wireless network that operates in a geographic area that overlaps with another wireless communication system. The method includes identifying channels utilized in the first wireless communication system that overlap with a channel or channels utilized on the second wireless communication system. Overlapping channels are "grey-listed", such that subsequent channel-hopping patterns still utilize the grey-listed channels, but at a reduced rate as compared with normal channel-hopping patterns.

DETAILED DESCRIPTION

Figure 1:
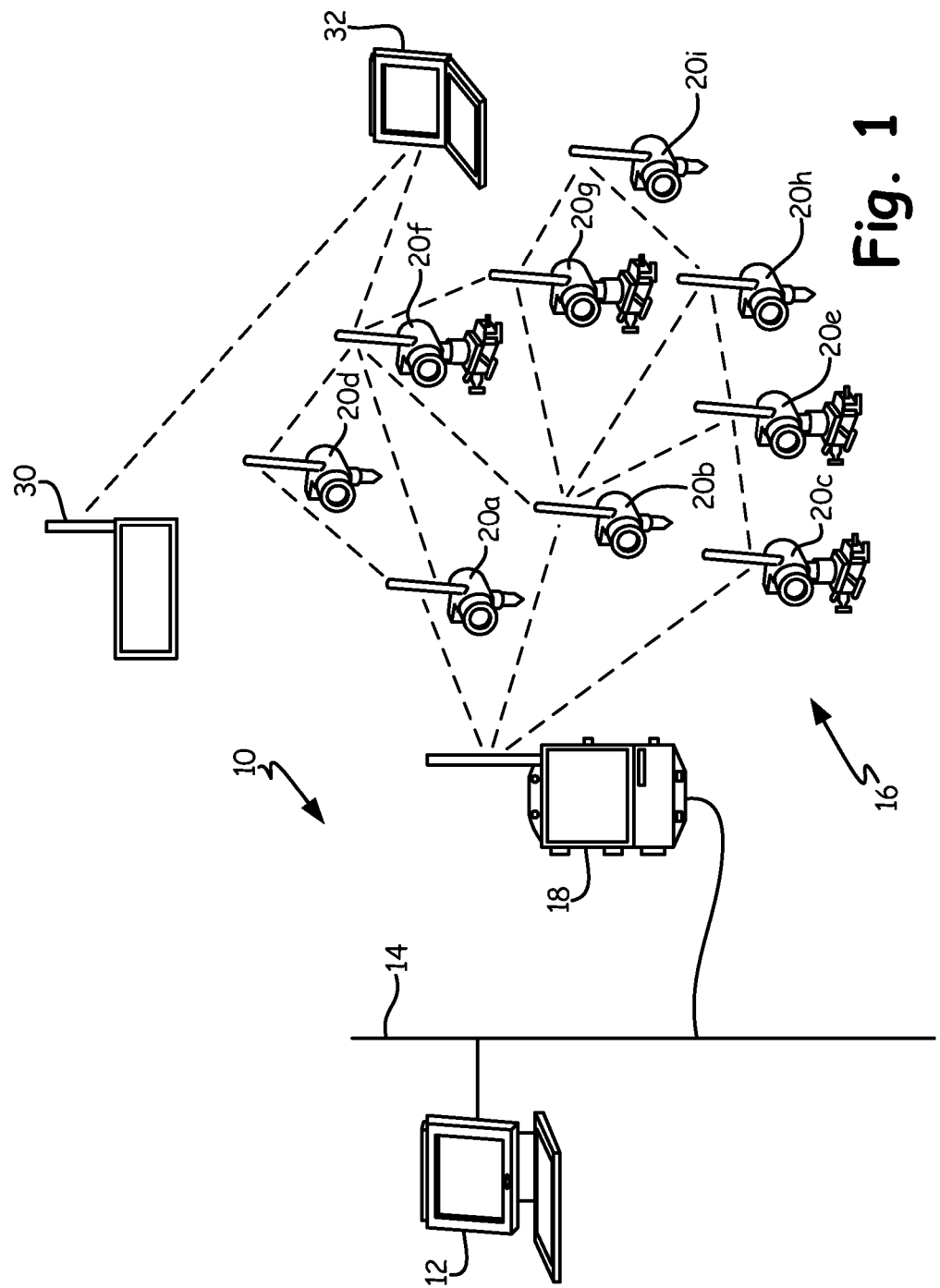
FIG. 1 is a diagram illustrating a self-organizing mesh network system in which messages are routed between a host and field devices.

FIG. 1 shows process communication system 10, which includes host computer 12, high-speed network 14, and wireless mesh network 16, which includes gateway 18 and wireless field devices or nodes 20a-20i.

Gateway 18 interfaces mesh network 16 with host computer 12 over high-speed network 14. Messages may be transmitted from host computer 12 to gateway 18 over network 14, and are then transmitted to a selected node of mesh network 16 over one of several different paths. Similarly, messages from individual nodes of mesh network 16 are routed through mesh network 16 from node-to-node over one of several paths until they arrive at gateway 18 and are then transmitted to host 12 over high-speed network 14. Messages communicated between individual nodes 20a-20i of mesh network 16 are provided via a wireless communication protocol, such as WirelessHART. To accommodate wireless communication, each node 20a-20i includes a wireless antenna. Depending on the wireless communication protocol selected, each node 20a-20i operates within a defined frequency range, which is sub-divided into a plurality of individual channels. Each node 20a-20i includes a communication controller (shown in FIG. 2) that implements a channel-hopping algorithm in which a sequence of channels are selected and employed.

Gateway 18 can communicate with host computer 12 over network 14 using a number of different communication protocols. In one embodiment, network 14 is an RS485 two wire communication link, on which gateway 18 may communicate with host computer 12 using the MODBUS protocol. In another embodiment, network 14 is an Ethernet network, and communication over network 14 can support MODBUS TCP/IP using an Ethernet interface. Gateway 18 communicates with the plurality of nodes 20a-20i making up mesh network 16 via a wireless control system protocol such as WirelessHART. In this way, messages originating with host computer 12 are provided via a wired communication link to gateway 18, which converts the messages to the wireless control system protocol and communicates them wirelessly via mesh network 16 to a field device associated with one of the nodes 20a-20i. Likewise, a message originating with a field device is communicated via the wireless control system protocol across mesh network 16 to gateway 18, and via wired communication network 14 to host computer 12. Although other wireless communication protocols may be employed by wireless mesh network 16, for purposes of this discussion the term WirelessHART is used to more easily distinguish the wireless communication protocol employed by wireless mesh network 16 from other wireless networks described.

In many applications, wireless mesh network 16 described above is utilized in a geographic location in which other, unaffiliated wireless networks are also employed. For example, many facilities utilize wireless networks to implement wireless local area networks (WLANs), which include at least one wireless router 30 and one transceiver device 32. Communication between wireless router 30 and transceiver device 32 is according to another wireless communication protocol, such as WiFi which utilizes the 802.11 communication protocol. However, the frequency range utilized by the wireless communication protocol (e.g., 802.11) overlaps with the frequency range utilized by WirelessHART. Once again, although a number of communication protocols may be employed, for purposes of this discussion the wireless communication protocol employed by wireless router 30 and transceiver device 32 is referred to as WiFi.

To prevent interference and message dropping associated with the wireless communication protocol while still providing the desired network resilience, the present invention utilizes an algorithm to modify the channel-hopping pattern of devices in wireless mesh network 16. Thus, rather than simply ignore or blacklist the channels being shared between WirelessHART and WiFi communication protocols, the present invention continues to use those overlapping channels, but decreases the frequency or rate at which those channels are utilized in the channel-hopping pattern. These overlapping channels are referred to herein as "grey-listed channels". The algorithm utilized to modify the channel-hopping pattern of devices in wireless mesh network 16 may reside within nodes 20a-20i, within gateway 18, and/or within host computer 12. For example, in one embodiment gateway 18 executes network manager software, which among other things, executes the algorithm to select a particular channel-hopping pattern. Once selected, the channel-hopping pattern is loaded onto each of the plurality of nodes 20a-20i employed as part of wireless mesh network 16.

Figure 2:
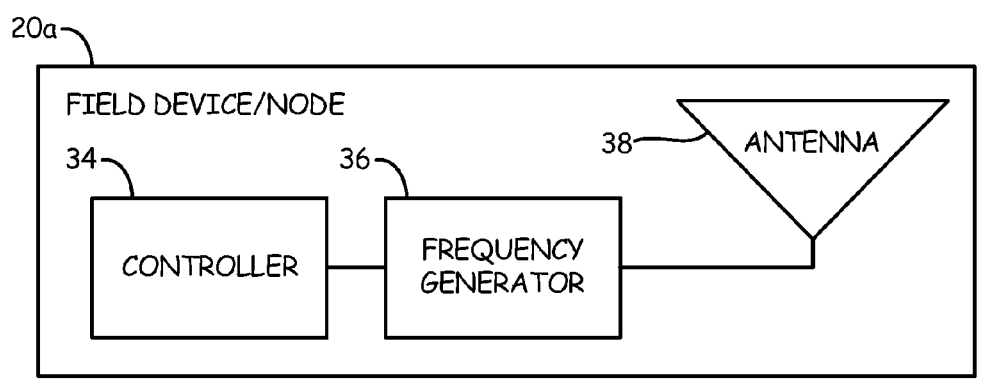
FIG. 2 is a block diagram of components included in a wireless field device according to an embodiment of the present invention.

FIG. 2 is a block diagram of components included as part of node 20a to implement WirelessHART communications used to communicate wirelessly with neighboring nodes and/or with gateway 18. In the embodiment shown in FIG. 2, node 20a includes controller 34, frequency generator 36, and wireless antenna 38.

In the embodiment shown in FIG. 2, controller 34 implements the algorithm to select the frequency or channel employed by node 20a to communicate with other nodes according to the wireless control system protocol. As discussed above, in other embodiments the algorithm utilized to determine the channel-hopping pattern may reside in gateway 18 and/or host computer 12. Controller 34 would typically also communicate with a sensor (not shown) used to measure a parameter (e.g., temperature, pressure) associated with node 20a and provide the measured parameter as data for wireless communication to gateway 18 and host computer 12. Frequency generator 36 generates the frequency selected by controller 34 to be utilized in wireless communications via antenna 38.

In one embodiment, controller 34 is responsible for detecting channel overlap between the wireless control system protocol and other wireless communication systems. For example, controller 34 may detect overlap based on interference measured on a particular channel, as evidenced by dropped packets, time required to deliver a packet and/or plurality of packets, and/or metrics indicative of interference. In other embodiments, a user may manually interact with controller 34 to indicate the overlapping channels based on user information regarding the channel(s) used by the other wireless communication system. Having detected the presence of overlapping channels, controller 34 modifies the use of those channels in the channel hopping algorithm. While still utilized in the algorithm, the use of the overlapping channels (i.e., grey-listed channels) is decreased. A plurality of algorithms may be utilized to determine how often grey-listed channels should be utilized in the channel hopping pattern.

In another embodiment, rather than each node 20a-20i being responsible for selecting the channel-hopping patter, this responsibility is implemented within gateway 18 (shown in FIG. 1). In this embodiment, gateway 18 may detect overlap based on interference measured on a particular channel, or may receive data from one or more of the wireless nodes 20a-20i regarding interference measured on a particular channel. Once again, evidence of interference may be based on number of dropped packets, time required to deliver a packet or plurality of packets, and/or other metrics indicative of interference. For example, if the number of packets dropped while communicating on a particular channel exceeds a threshold value, then the channel is identified as overlapping with another channel and is selected for grey-listing. The algorithm implemented by gateway 18 identifies or grey-lists the detected overlapping channels, and generates a channel-hopping pattern that reduces the rate at which grey-listed channels are employed in the channel-hopping pattern. In one embodiment, a rate at which grey-listed channels are utilized in the channel-hopping pattern is reduced by at least 50% from a normal channel-hopping pattern. Gateway 18 would then communicate the new or modified channel-hopping pattern to each of the plurality of nodes 20a-20i.

Figure 3:
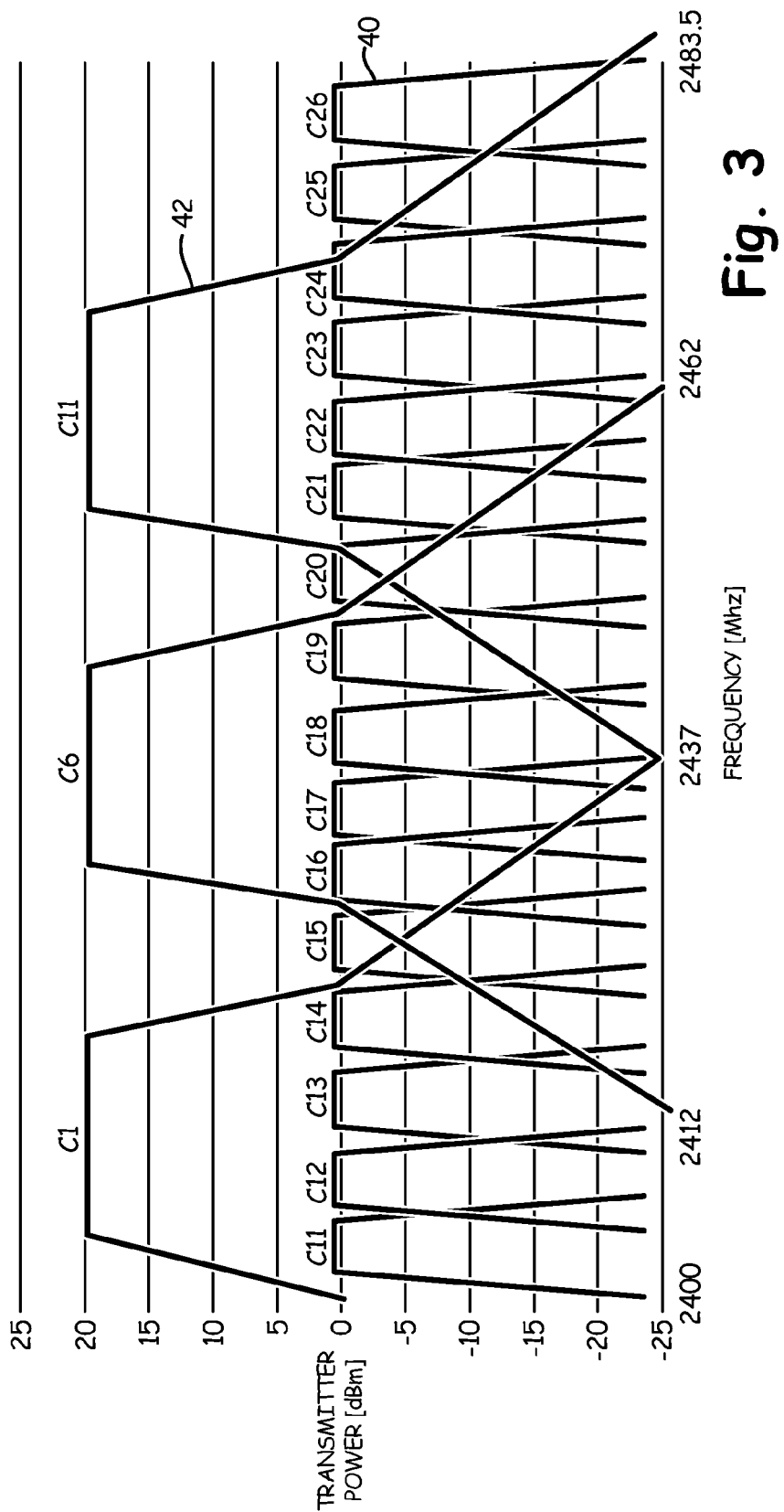
FIG. 3 is a waveform diagram that illustrates overlap issues that arise when competing wireless communication protocols are used in the same geographic location.

FIG. 3 is a graph that illustrates an exemplary embodiment of channel overlap between WirelessHART and WiFi protocols. WirelessHART communications 40 are illustrated by a solid line and WiFi communications 42 are illustrated by dashed line. The y-axis of the graph illustrates transmitter power associated with each channel represented in unit of decibel-meters (dBm). The x-axis of the graph illustrates transmitter frequency, with various frequency ranges associated with various channels of WirelessHART communications 40 and WiFi communications 42. In the embodiment shown in FIG. 3, the transmitter power associated with WiFi communications 42 are greater than the transmitter power associated with WirelessHART communications 40. As a result, overlap between channels will result in interference and loss of communication quality in WirelessHART communications 40, but not in WiFi communications 42.

In the embodiment shown in FIG. 3, WirelessHART communications 40 are sub-divided into at least fifteen channels, labeled c11 through c26. WiFi communications 42 are sub-divided into three channels labeled C1, C6 and C11. As illustrated, channels c11-c14 associated with WirelessHART communications 40 overlap with channel C1 of WiFi communications 42. Likewise, channels c15-c19 of WirelessHART 40 overlaps with channel C6 of WiFi communications 42 and channels c21-c24 of WirelessHART 40 overlaps with channel C11 of WiFi 42.

As a result, if WiFi communications 42 are operating on channel C6, then a typical system would be programmed by a user to skip or blacklist channels c16-c19 of WirelessHART communications 40. As a result, WirelessHART communications 40 would utilize only channels c11-c15 and c20-c26 in the channel hopping pattern. In contrast, the present invention does not blacklist channels c16-c19, but rather modifies the use of these channels to be less frequent than the other channels (e.g., c11-c15 and c20-c26). In this way, the resiliency of wireless control system protocol 40 is maintained while minimizing interference between the two wireless communication systems. In addition, packet losses are minimized due to a reduced probability of collisions caused by interference with the other wireless network, and therefore power consumption is reduced by reducing the number of packets that must be re-sent.

Figure 4:
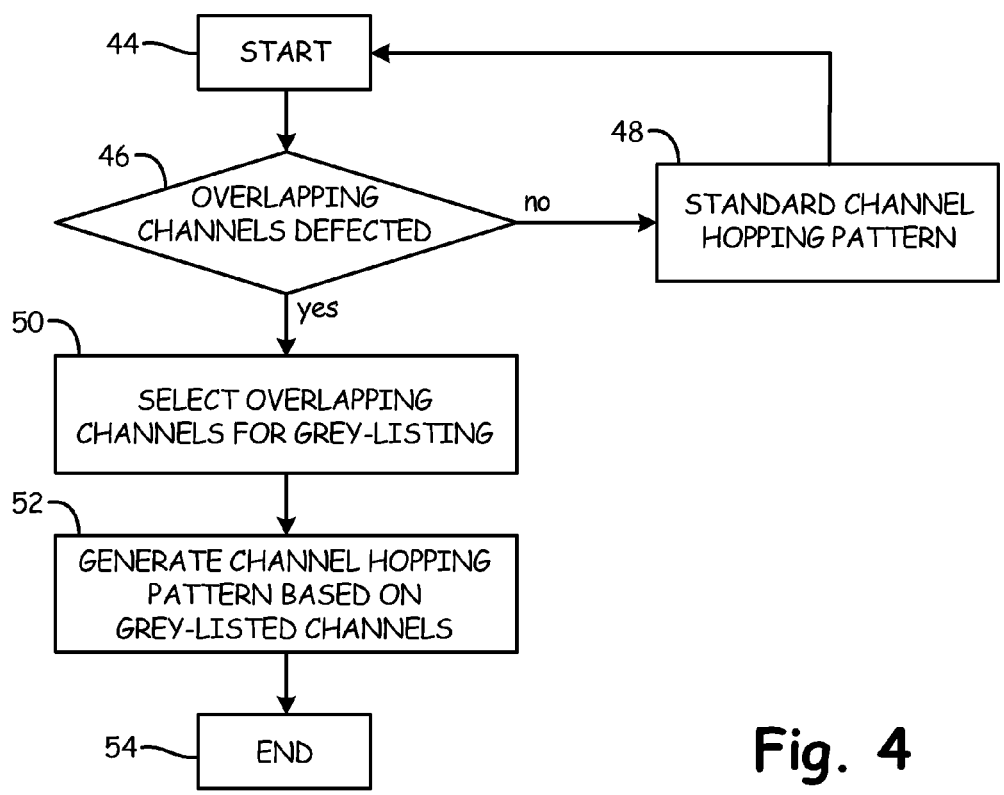
FIG. 4 is a flowchart illustrating functions performed by the controller to implement grey-listing of channels according to an embodiment of the present invention.

FIG. 4 is a flowchart illustrating functions performed by controller 34 to implement grey channel listing according to an embodiment of the present invention. The process starts at step 44. At step 46, controller 34 detects overlapping channels. As discussed above, controller 34 may be capable of automatically detecting overlapping channels by analyzing interference detected on each channel. For example, controller 34 may utilize the number of packets dropped during communication on each channel to detect interference associated with channel overlap. If the number of packet dropped on a particular channel exceeds a threshold value, then interference is detected with the associated channel. In other embodiments, controller 34 may rely on information provided by a user indicating those channels that will overlap with another wireless communication system.

If no channel overlap is detected, then at step 48, controller 34 utilizes a standard channel hopping pattern, in which each channel is utilized at an equal rate. If channel overlap is detected, then at step 50, controller 34 selects those channels to be grey-listed. Typically, grey-listed channels will be adjacent to one another. However, controller 34 may select non-adjacent channels for grey-listing.

At step 52, controller 34 generates a channel-hopping pattern based on the grey-listed channels. For example, the original channel hopping pattern appears as follows, and would repeat indefinitely:

$\underline{c11}$-c15-c16-c20-c21-c25-$\underline{c12}$-c15-c17-c20-c22-c26-$\underline{c13}$-c15-c18-c20-c23-c25-$\underline{c14}$-c15-c19-c20-c24-c26

In an embodiment in which overlap is detected on channels c11-c14 (underlined in the above-pattern), controller 34 would grey-list channels c11-c14 and modify the channel hopping pattern in the following exemplary manner:

$\underline{c26}$-c15-c16-c20-c21-c25-$\underline{c12}$-c15-c17-c20-c22-c26-c$\underline{20}$-c15-c18-c20-c23-c25-$\underline{c14}$-c15-c19-c20-c24-c26

The modified channel hopping pattern replaces channel c11 with channel c26 in the first segment and replaces channel c13 with channel c20 in the third segment. However, channels c12 and c14 are still utilized. This pattern would be repeated, but in the next iteration, channels c11 and c13 would be utilized and channels c12 and c14 would be left out. This results in a 50% reduction in the grey-listed channels, while maintaining resiliency by utilizing all available channels. The process ends at step 52, although controller 34 may continue monitoring at step 46 to detect changes in channel overlap that require new channels to be added to the grey list or removed from the grey list.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of providing channel-hopping patterns for a first wireless communication system that experiences interference on one or more channels from a second wireless communication system, the method comprising:
    identifying channels of the first wireless communication system that experience interference from the second wireless communication system;
    selecting the identified channels for grey-listing; and
    creating a channel-hopping pattern for the first communication system that utilizes all channels including the grey-listed channels,
    wherein, if no channels are grey-listed, then all channels appear in the channel-hopping pattern at an equal rate,
    wherein, if one or more of the channels are grey-listed, then the grey-listed channels appear in the channel-hopping pattern at a reduced rate compared with a rate of channels not grey-listed.

2. The method of claim 1, wherein identifying channels in the first wireless communication system includes measuring a number of packets dropped when communicating on a particular channel associated with the first wireless communication system, wherein if the number of packets dropped exceeds a threshold then the channel is identified as experiencing interference and is selected for grey-listing.

3. The method of claim 1, wherein creating a channel-hopping pattern includes reducing the rate at which the identified channels appear in the channel-hopping pattern by at least 50% of an initial rate.

4. A wireless field device comprising:
    an antenna that allows the wireless field device to send and receive wireless transmissions;
    a frequency generator that generates a commanded frequency at which the antenna operates; and
    a controller that identifies and grey-lists channels of a first wireless communication system that experience interference from a second wireless communication system, the controller generating a channel-hopping pattern that is used to command the frequency generator to a desired channel frequency, wherein, if no channels are grey-listed, then the controller utilizes all of the channels at an equal rate, and wherein, if one or more channels are grey listed, then the grey-listed channels are utilized in the channel-hopping pattern at a reduced rate compared with a rate of channels not grey-listed.

5. The wireless field device of claim 4, wherein the controller identifies grey-listed channels by monitoring and counting a number of packets dropped while communicating on each channel.

6. The wireless field device of claim 5, wherein if the count of packets dropped while communicating on a particular channel exceeds a threshold value, then the channel is identified as experiencing interference and is selected for grey-listing.

7. The wireless field device of claim 5, wherein the rate at which grey-listed channels are utilized in the channel-hopping pattern is reduced by at least 50% from a normal channel-hopping pattern.

8. A wireless mesh network having of a plurality of nodes that communicate with one another according to a wireless communication protocol having a plurality of channels, wherein the wireless mesh network utilizes a combination of hardware and software to implement a channel-hopping method used to generate a channel-hopping pattern used by the wireless nodes to communicate, the method comprising:
  identifying one or more channels utilized by the wireless field device that experiences interference from an separate wireless network;
  grey-listing the identified channels that experience interference from an separate wireless network; and
  utilizing the grey-listed channels in a channel-hopping pattern but reducing a rate at which the grey-listed channels are utilized, compared with a rate of channels not grey-listed, in a channel-hopping pattern employed by the wireless field device.

9. The wireless mesh network of claim 8, wherein identifying one or more channels utilized by the wireless field device that experience interference from the separate wireless network includes:
  monitoring and counting a number of packets dropped while communicating on each channel;
  comparing the count of dropped packets to a threshold value; and
  identifying a channel as experiencing interference from the separate wireless network if the count of dropped packets exceeds the threshold value.

10. The wireless mesh network of claim 8, wherein reducing a rate at which the grey-listed channels are utilized in a channel-hopping pattern employed by the wireless field device includes reducing the rate at which the grey-listed channels are utilized by at least 50% of a rate used during normal operation.

11. The wireless mesh network of claim 8, wherein each of the plurality of nodes includes a controller that implements the channel-hopping algorithm used to generate the channel-hopping pattern.

12. The wireless mesh network of claim 8, further including a gateway connected to communicate wirelessly with one or more of the plurality of nodes, wherein the gateway includes an algorithm to implement the channel-hopping algorithm used to generate the channel-hopping pattern.

13. A wireless mesh network comprising:
  a plurality of nodes that communicate with one another according to a wireless communication protocol; and
  a gateway connected to communicate with one or more of the plurality of nodes according to the wireless communication protocol, wherein the gateway generates a channel-hopping pattern that is communicated to each of the plurality of nodes, wherein the gateway identifies channels that experience interference from a separate wireless communication system and identifies those channels for grey-listing, wherein the controller utilizes the grey-listed channels but reduces a rate at which the grey-listed channels are utilized, compared with a rate of channels not grey-listed, in the channel-hopping pattern communicated to each of the plurality of nodes.

14. The wireless mesh network of claim 13, wherein the gateway identifies grey-listed channels based on a number of packets dropped while communicating on each channel.

15. The wireless mesh network of claim 14, wherein if the number of packets dropped while communicating on a particular channel exceeds a threshold value, then the channel is identified as experiencing interference and is selected for grey-listing.

16. The wireless mesh network of claim 5, wherein a rate at which grey-listed channels are utilized in the channel-hopping pattern is reduced by at least 50% from a normal channel-hopping pattern.

* * * * *